United States Patent [19]

Liessem

[11] 4,417,002

[45] Nov. 22, 1983

[54] FOAM MANUFACTURE

[75] Inventor: Bernhard Liessem, Eupen, Belgium

[73] Assignee: Kabel-und-Gummiwerke AG, Eupen, Belgium

[21] Appl. No.: 396,124

[22] Filed: Jul. 7, 1982

[30] Foreign Application Priority Data

Jul. 9, 1981 [GB] United Kingdom ................ 8121185
Aug. 22, 1981 [GB] United Kingdom ................ 8125721

[51] Int. Cl.$^3$ .............................................. C08G 18/14
[52] U.S. Cl. .................................... 521/128; 521/129; 521/130; 521/157
[58] Field of Search ................ 521/128, 129, 130, 157

[56] References Cited

U.S. PATENT DOCUMENTS

| 2,932,621 | 4/1960 | Terry ................................. | 521/130 |
| 3,087,900 | 4/1963 | Brown ................................ | 521/157 |
| 3,567,663 | 3/1971 | Triolo et al. ........................ | 521/130 |
| 3,663,465 | 5/1972 | Fogiel ................................ | 521/130 |

FOREIGN PATENT DOCUMENTS 1453258 10/1976 United Kingdom .
1482213  8/1977 United Kingdom .

Primary Examiner—Maurice J. Welsh
Attorney, Agent, or Firm—Fleit, Jacobson, Cohn & Price

[57] ABSTRACT

A carboxylic acid or carboxylate is reacted with an isocyanate to produce gas which is used to give a blowing action in the manufacture of a foam plastics material, especially foam polyurethane.

Preferably formic acid or a formate is used.

10 Claims, No Drawings

FOAM MANUFACTURE

This invention relates to the manufacture of foam materials particularly polyurethane foam.

Polyurethane foam is manufactured by reacting a polyhydroxyl (polyol) compound with a polyisocyanate in the presence of a blowing agent and usually one or more catalysts, reaction modifiers and other additives.

Water is commonly used to provide a blowing action. Water reacts with the isocyanate to liberate carbon dioxide gas which expands the reaction mixture. At the same time amine groups are formed which react with further isocyanate to produce urea groups which have a hardening effect on the resulting foam. The reaction is vigorously exothermic and there is a limit in practice to the degree of expansion which can be achieved without undue scorch or fire risk.

In addition to the presence of water, it is also known to use an inert volatile organic compound as a blowing agent, such as fluorocarbon or methylene chloride. Such compounds boil with the heat produced during the course of polyurethane-forming reaction and thereby expand the reaction mixture without exerting any hardening effect. Softer, lower density foams can therefore be formed. However, the gases emitted give rise to problems. Fluorocarbon gases are thought to exert an ecologically undesirable effect on the atmosphere; and methylene chloride has a high odour; and special equipment is required for gas extraction purposes.

Compounds which liberate nitrogen on heating can also be used as blowing agents, but these are expensive.

An object of the present invention is to provide a blowing agent useful in the manufacture of polyurethane foam and which is inexpensive, allows the production of low density of soft foams, and does not involve the production of undesirable organic gases as mentioned above.

According to the invention therefore there is provided a method of manufacturing foam material in which such material is formed in the presence of a blowing agent, characterised in that the blowing agent comprises at least one substance selected from carboxylic acids and salts of carboxylic acids which is reacted with an isocyanate to liberate gas. It is visualised that the invention will find particular although not exclusive application in the manufacture of polyurethane foam by the reaction of a polyol with a polyisocyanate in which case the isocyanate used to react with the carboxylic acid/carboxylate blowing agent will preferably be the same substance as that used for reaction with the polyol. Moreover, it is visualized that the carboxylic acid will most preferably comprise formic acid and/or a salt or mixture of salts of formic acid. In the latter respect, the following salts have been found to be useful:

salts of formic acid with weak organic bases such as hydrazine, triethylamine, dimethylbenzylamine, triethylenediamine.

The carboxylic acid/carboxylate may be added as such or may be formed in situ.

With the method of the invention, when applied to the manufacture of polyurethane foam and particularly where formic acid and/or a salt or salts thereof is used, it is possible to obtain a low density foam since the reaction with the isocyanate produces liberal amounts of gas capable of achieving good foam expansion. Moreover, the blowing agent used in the present invention, particularly formic acid, can be particularly inexpensive and can avoid the production of undesirable organic gases of the kind discussed above.

The reaction between the preferred carboxylic acid, formic acid, and the isocyanate involves the liberation of carbon dioxide and carbon monoxide gases, and it is observed that one mole of formic acid gives two moles gas (i.e. one mole $CO_2$ and one mole CO) whereas, in the case of the conventional polyurethane-forming reaction where water is relied upon for gas production, only one mole of gas is produced for one mole of water. At the same time, a urea is formed. Where a formate is used it is possible that a similar reaction may occur with the formate radical, possibly following dissociation of the salt in aqueous medium.

With the method of the present invention and particularly in the context of foam polyurethane manufacture, the carboxylic acid and/or carboxylate blowing agent may constitute the sole blowing agent: it may even be possible to omit water in the manufacture of foam polyurethane especially since the acid may give rise to the production of ureas. If desired, however, it is possible additionally to incorporate water and/or one or more other blowing agents, such as known volatile organic compounds (e.g. trichlorofluoromethane, dichlorodifluoromethane, dichloromethane, methylene chloride), in which case advantageously the presence of the acid reduces the quantity of such other agent or agents required to produce a foam of desired physical properties. If desired it may also be possible to supplement the blowing action of the carboxylic acid and/or carboxylate with a carbonate or bicarbonate which releases gas on acid reaction.

In the case of polyurethane manufacture, the polyol and polyisocyanate may each comprise any suitable substance or combination of substances as conventionally used in the manufacture of polyurethane foam. Other substances such as catalysts, modifiers, polymeric additives and the like may also be incorporated in the reaction mixture in accordance with conventional practice.

Thus, for example, any suitable polyisocyanate may be used including aliphatic, cycloaliphatic, araliphatic, aromatic and heterocyclic polyisocyanates such as are known for use in the polyisocyanate/polyol polyurethane-forming reaction (see for example British Pat. No. 1,453,258).

Suitable commercially readily available polyisocyanates include 2,4 and 2,6 tolylene diisocyanates also mixtures of these isomers (called in general TDI), polyphenyl polymethylene polyisocyanates of the type obtained by condensing aniline with formaldehyde, followed by phosgenation (called in general crude MDI), and polyisocyanates containing carbodiimide groups, urethane groups, allophonate groups, isocyanate groups, urea groups or biuret groups (called in general polyisocyanates).

Any suitable polyol may be used including polyether polyols having a molecular weight in the range of 200 to 10,000 such as are known for use in the polyisocyanate/polyol polyurethane-forming reaction and as described for example in British Pat. No. 1,482,213. Such known polyether polyols can be obtained by reaction of alkylene oxides with active hydrogen-containing compounds, the molecular weight of the reaction product depending on the amount of alkylene oxide reacted.

Suitable catalysts include organometallics such as stannous octoate and dibutyl tin dilaurate (usually provided to catalyse the polyol/isocyanate reaction) and/or amines such as dimethylbenzylamine tetramethylethylenediamine, triethylenediamine (usually provided to catalyse the water/isocyanate reaction); and the reaction mixture may also include reaction modifiers such as cross-linked or chain-linking agents, for example diethanolamine, triethanolamine, ethylene glycol, glycerol, dipropylene glycol and phenylene diamine, flame-proofing agents, for example halogenated alkyl phosphates, fillers for example barium sulphate, foam stabilizers or cell regulators such as dimethyl silicone oils or low molecular weight modifications thereof.

The process may be operated in any suitable manner, for example, using mixing heads, reaction chambers, conveyor belts and the like in the case of continuous production of slab stock, or using moulds or other equipment in accordance with other production procedures. In the formulation of the reaction mixture polyisocyanate additional to that required for reaction with the polyol is required for reaction with the carboxylic acid/carboxylate blowing agent. Where formic acid is used and the polyisocyanate is the substance known as toluene diisocyanate it may be desirable to allow such additional amount of isocyanate corresponding to, say, at least 3.78 times the weight of the formic acid. An equivalent excess in relation to the formate radical may be provided in the case of a salt of formic acid.

It has been found possible to replace say seven or eight parts by weight of fluorocarbon 11 with one part by weight of formic acid to obtain approximately the same foam density. The blowing agent may be used in the range 0.05 to 5.0 parts per hundred parts by weight of polyol, in the case of formic acid (and an equivalent range in relation to the formate radical where a salt of formic acid is used), although amounts outside this range may also be useful.

The carboxylic acid/carboxylate blowing agent may be introduced with the isocyanate at an early stage so that blowing is effected at the same time as the occurrence of a polymerisation reaction producing plastics material to be foamed. Thus, in the case of foam polyurethane manufacture the blowing agent may be introduced simultaneously with the mixing of the polyol and the polyisocyanate (and other reaction ingredients). Alternatively, the carboxylic acid/carboxylate blowing agent may be introduced at a different stage, for example, after such mixing (e.g. by introduction into the reaction mixture at a later stage in the mixing head). Indeed it may be desirable to select the stage of introduction of the acid to ensure progression of the polyurethane-forming reaction at a desired rate, although alternatively or additionally this can be achieved by appropriate selection of catalyst/modifier proportions in relation to the amount of acid used.

The method of the invention is particularly suited to the production of soft polyurethane foam, but is not intended to be limited to this field of application. The invention may also be applied to the production of rigid, semi-rigid and microporous polyurethane foams. With regard to the production of relatively hard foams it is observed that the carboxylic acid/carboxylic when reacting with a given amount of isocyanate to yield a given urea content gives a foam temperature rise which is less than would have been obtained if water were to react with the same amount of isocyanate to yield the same urea content, due to the larger amount of gas which is liberated in the former case. As a consequence this lower exotherm may be used to advantage in obtaining less foam scorch or fire risk at low density.

Moreover, the invention may be applied to the production of foam plastics materials other than polyurethane foam, for example, foam polyvinylchloride or polyethylene or polyester. Thus, the isocyanate, for example, toluene diisocyanate (or other aromtic isocyanate) may be blocked with phenol prior to mixing with the acid so that gas is only produced when the isocyanate is unblocked by heating.

The invention will now be described further with reference to the following Examples Nos. 1 to 17, all specified proportions being parts by weight. Examples 2 and 4, 5, 7, 9, 11, 13, 14, 15, 17, are in accordance with the invention. The other Examples are comparative examples not in accordance with the invention.

|  | Ex. 1 | Ex. 2 | Ex. 3 | Ex. 4 | Ex. 5 |
|---|---|---|---|---|---|
| Polyol | 100 | 100 | 100 | 100 | 100 |
| Water | 2.8 | 1.8 | 3.15 | 2.05 | 3.65 |
| Dabco 33LV (Houdry Process Corporation) (Triethylenediamine) | 0.3 | 0.4 | 0.3 | 0.4 | 0.4 |
| Formic Acid | — | 3.15 | — | 4.0 | 0.55 |
| Silicone Surfactant | 1.2 | 0.9 | 1.5 | 1.2 | 0.9 |
| Stannous Octoate | 0.25 | 0.1 | 0.29 | 0.09 | 0.16 |
| TDI 80:20 | 36. | 38. | 39. | 44. | 46. |
| Fluorocarbon 11 (Monofluorotrichloromethane) | 12.5 | — | 19. | — | 3.5 |
| FOAM PROPERTIES |  |  |  |  |  |
| Density Kg/m$^3$ | 22. | 22. | 19. | 19. | 22. |
| ISO Hardness |  |  |  |  |  |
| 25% Indentation | 48. | 45. | 34. | 35. | 63. |
| 40% Indentation | 56. | 55. | 42. | 43. | 76. |
| 65% Indentation | 100. | 100. | 82. | 80. | 143. |

Examples 1 to 5 relate to the production of soft, flexible polyurethane foam. The polyol is a triol of MW3500 and 46 hydroxyl number. The formic acid is added to the mixture after all other ingredients have been blended together in a manner normally accepted in the industry.

|  | Example 6 | Example 7 |
|---|---|---|
| CP 4610 (Polyol) (Dow Chemicals) | 100 | 100 |
| RN 411 (Polyol) (Dow Chemicals) | 2.0 | 2.0 |
| Water | 2.8 | 2.8 |
| Triethanolamine | 1.0 | 1.0 |
| Formic Acid | — | 1.52 |
| Dimethylbenzylamine | 0.8 | 0.8 |
| Triethylamine | 0.3 | 0.3 |
| Dabco 33LV (Houdry Process Corporation) | 0.5 | 0.5 |
| Silicone Surfactant B4113 (Bayer AG) | 0.4 | 0.4 |
| Fluorocarbon 11 | 6.0 | — |
| Crude MDI | 24.0 | 23.0 |
| TDI | 16.0 | 15.0 |
| FOAM PROPERTIES |  |  |
| Density Kg/m$^3$ | 30.0 | 32.0 |
| ISO Hardness |  |  |
| 25% Indentation | 29. | 22. |
| 40% Indentation | 41. | 30. |
| 65% Indentation | 97. | 75. |

These foams are high resilience mouldings. The polyol designated CP 4610 is a 4800 molecular weight triol (hydroxyl number approximately 35). The polyol designated RN 411 is a sucrose/glycerol based polyol (hydroxyl number approximately 410).

|  | Example 8 | Example 9 |
|---|---|---|
| CP 4610 (Polyol) (Dow Chemicals) | 100 | 100 |
| Calcium Carbonate | 50 | 50 |
| RN 411 (Polyol) (Dow Chemicals) | 7.5 | 7.5 |
| Dabco 33LV (Houdry Process Corporation) | 0.6 | 0.6 |
| Dimethylcyclohexylamine | 0.6 | 0.6 |
| Dimethylaminoethanol | 0.2 | 0.2 |
| Water | 3.5 | 3.5 |
| Silicone Surfactant B4113 (Bayer AG) | 0.6 | 0.6 |
| Formic Acid | — | 1.7 |
| Dibutyl-tin-Dilaurate | — | 0.1 |
| Crude MDI | 39. | 39. |
| TDI | 26. | 26. |
| FOAM PROPERTIES |  |  |
| Density Kg/m$^3$ | 64. | 48. |

These foams are semi-rigid.

|  | Example 10 | Example 11 |
|---|---|---|
| RN 411 (Polyol) (Dow Chemicals) | 100. | 100 |
| Water | 2.0 | 2.0 |
| Dabco 33LV (Houdry Process Corporation) | 0.5 | 0.5 |
| Dimethylcyclohexylamine | 0.5 | 0.5 |
| Silicone Surfactant B4113 (Bayer AG) | 0.5 | 0.5 |
| Fluorocarbon 11 | 10. | — |
| Formic Acid | — | 1.7 |
| Crude MDI | 62.1 | 62.1 |
| TDI | 41.4 | 41.4 |
| FOAM PROPERTIES |  |  |
| Density Kg/m$^3$ | 34. | 35. |

These foams are rigid.

|  | Example 12 | Example 13 |
|---|---|---|
| Desmophen D-2200 (Bayer) | 100. | 100. |
| Water | 5.0 | 4.0 |
| Formic Acid | — | 2.6 |
| Dimethylbenzylamine | 1.6 | 0.8 |
| Dabco 33LV | 0.3 | 0.3 |
| Hexamethylene tetramine | 0.2 | 0.4 |
| Silicone L532 (Union Carbide) | 1.0 | 1.0 |
| TDI 65:35 | 57.5 | 57.5 |
| FOAM PROPERTIES |  |  |
| Density Kg/m$^3$ | 23.3 | 21.2 |

Desmophen D-2200 is a proprietary polyester polyol.

|  | Example 14 | Example 15 |
|---|---|---|
| Polyether polyol | 100. | 100. |
| Water | 3. | 3. |
| Formic Acid | 2.6 | 2.6 |
| Triethylamine | 2.85 | — |
| Silicone B4900 (Goldschmidt AG) | 2.6 | 1.0 |
| Stannous Octoate | 0.2 | 0.2 |
| Dimethylbenzylamine | — | 0.2 |
| Tetramethylethylenediamine | — | 0.3 |
| TDI 80:20 | 57. | 57. |
| FOAM PROPERTIES |  |  |
| Cream time | 6 seconds | 7 seconds |
| Rise time | 113 seconds | 116 seconds |
| Density Kg/m$^3$ | 21.3 | 21.7 |

The water, formic acid and triethylamine of Example 14 are premixed to give the amine formate.

|  | Example 16 | Example 17 |
|---|---|---|
| Baytherm VP PU 1798 | 100. | 100. |
| Water | 0.6 | 0.1 |
| Crude MDI | 105. | 105. |
| Dimethylbenzylamine | 1.0 | 1.0 |
| Formic Acid | — | 1.28 |
| FOAM PROPERTIES |  |  |
| Density Kg/m$^3$ | 180 | 155 |

These foams are high density rigid foams. The Baytherm material is a proprietary low molecular weight polyol blended with additives for use as a starting material in the manufacture of polyurethane foam.

It is of course to be understood that the invention is not intended to be restricted to the details of the above Examples.

I claim:

1. A method of manufacturing foam material in which such material is formed in the presence of a blowing agent, characterised in that the blowing agent comprises at least one substance, selected from formic acid and salts of formic acid, which is reacted with an isocyanate to liberate gas.

2. A method according to claim 1, characterised in that said blowing agent comprises at least one salt of formic acid with a weak organic base.

3. A method according to claim 2, characterised in that said weak organic base is selected from hydrazine, triethylamine, dimethylbenzylamine, triethylenediamine.

4. A method according to claim 1, characterised in that said acid and/or carboxylate blowing agent is used in conjunction with at least one other blowing agent.

5. A method according to claim 4, characterised in that said other blowing agent comprises at least one substance selected from the group consisting of: water which reacts with an isocyanate and a volatile, inert organic compound which boils during the foam manufacturing process.

6. A method according to claim 1, characterised in that it is applied to the manufacture of foam polyurethane by reaction of a polyol with an isocyanate.

7. A method according to claim 6, characterised in that said isocyanate used for reaction with the carboxylic acid/blowing agent is the same substance as that used for reaction with the polyol.

8. A method according to claim 6, characterised in that said acid/carboxylate blowing agent comprises formic acid and this is present in the range 0.05 to 5.0 parts per hundred parts by weight of the polyol.

9. Polyurethane foam made by reaction of a polyol with an isocyanate in the presence of a blowing agent characterised in that said blowing agent comprises at least one substance selected from the group consisting of formic acid and salts of formic acid, which substance reacts with said isocyanate to liberate gas.

10. A method according to claim 1, characterized in that said blowing agent comprises a mixture of salts of formic acid.

* * * * *